United States Patent
Van Heteren

(10) Patent No.: US 6,885,309 B1
(45) Date of Patent: Apr. 26, 2005

(54) METER TO INTERNET PATHWAY

(75) Inventor: John Gerald Van Heteren, Foster City, CA (US)

(73) Assignee: Cellnet Innovations, Inc., Alpharetta, GA (US)

( * ) Notice: Subject to any disclaimer, the term of this patent is extended or adjusted under 35 U.S.C. 154(b) by 0 days.

(21) Appl. No.: 09/585,819

(22) Filed: Jun. 1, 2000

(51) Int. Cl.[7] .................................................. G08C 19/00
(52) U.S. Cl. .............................. 340/870.11; 340/870.02; 340/540
(58) Field of Search ........................ 340/870.02, 870.03, 340/870.11, 540, 531, 539

(56) References Cited

U.S. PATENT DOCUMENTS

| | | | |
|---|---|---|---|
| 5,448,230 A | * | 9/1995 | Schanker et al. ...... 340/870.03 |
| 5,553,094 A | * | 9/1996 | Johnson et al. ........ 340/870.03 |
| 5,699,276 A | | 12/1997 | Roos ...................... 364/514 A |
| 5,852,409 A | | 12/1998 | Bell ....................... 340/870.02 |
| 5,897,607 A | * | 4/1999 | Jenney et al. ................. 702/62 |
| 6,195,018 B1 | | 2/2001 | Ragle et al. ........... 340/870.01 |
| 6,327,541 B1 | * | 12/2001 | Pitchford et al. ............. 702/62 |
| 6,437,692 B1 | * | 8/2002 | Petite et al. ................. 340/540 |

FOREIGN PATENT DOCUMENTS

WO   WO 97/29466   8/1997   ........... G08C/15/06

* cited by examiner

Primary Examiner—Timothy Edwards, Jr.
(74) Attorney, Agent, or Firm—Kilpatrick Stockton LLP

(57) ABSTRACT

Method and system to collect measurements from multiple metering devices. The collector devices store and forward measurement information through a network connection to a remote processing center to generate an output based on the measurement information.

51 Claims, 8 Drawing Sheets

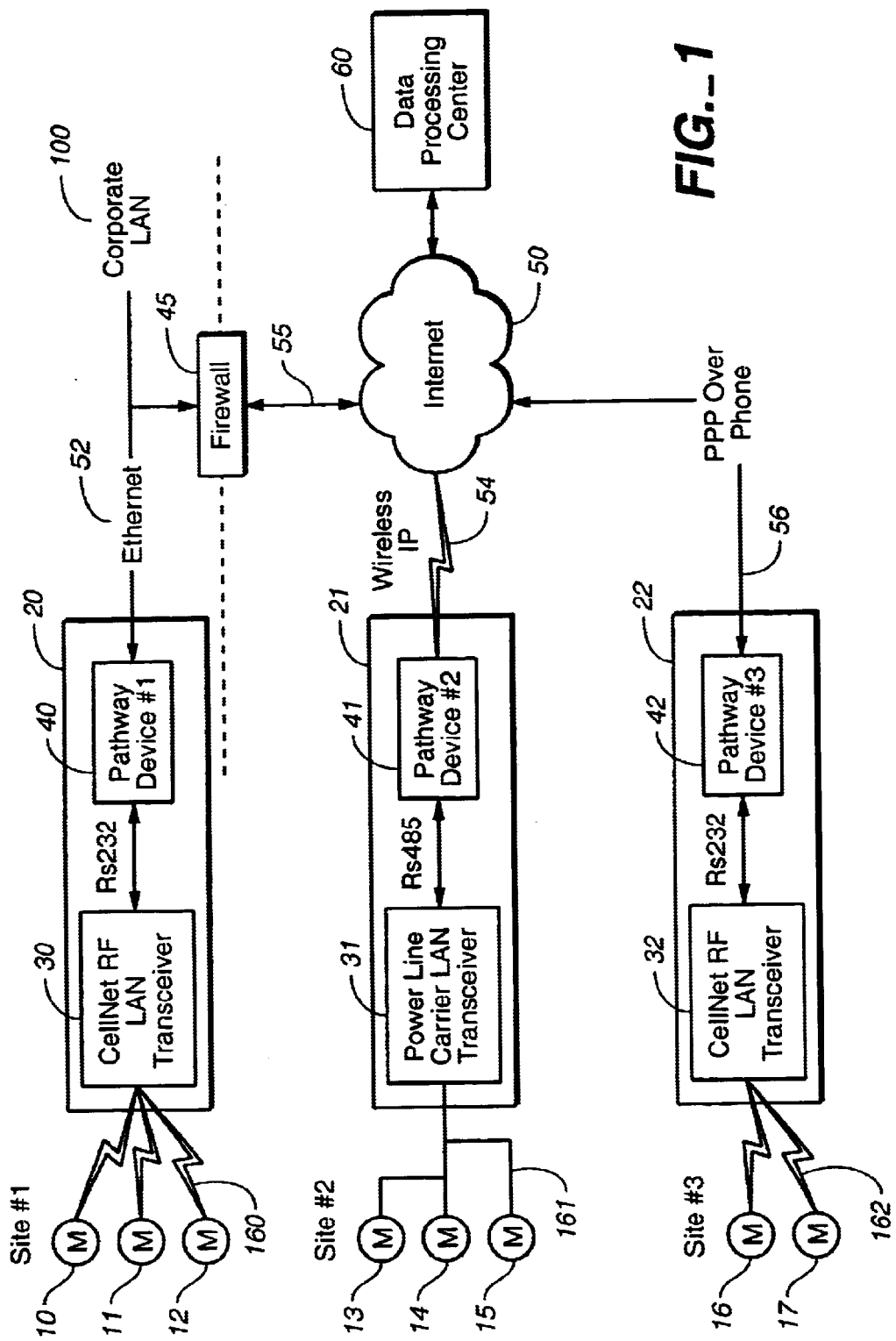
FIG._1

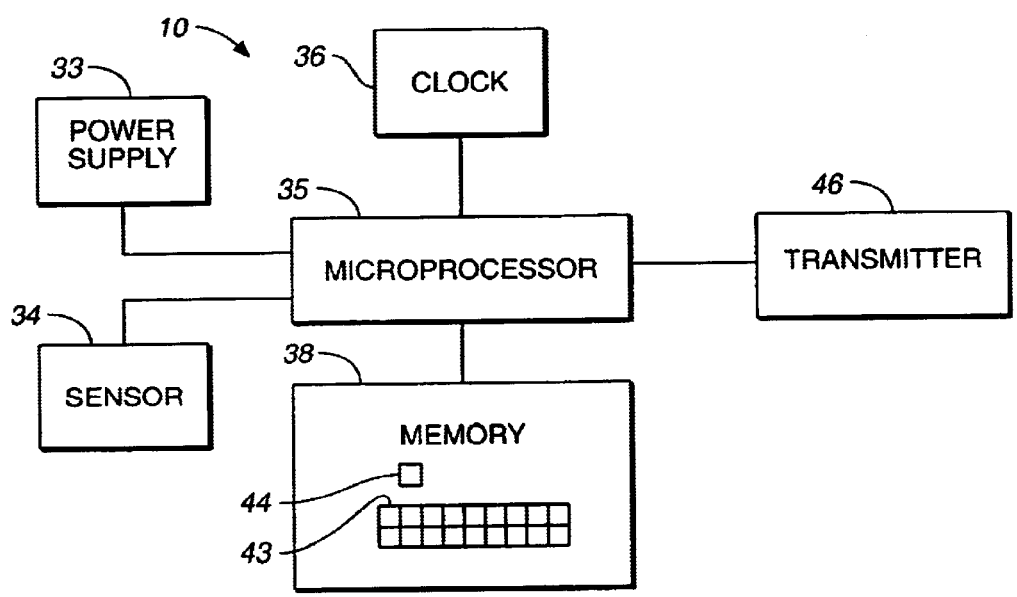
FIG._2

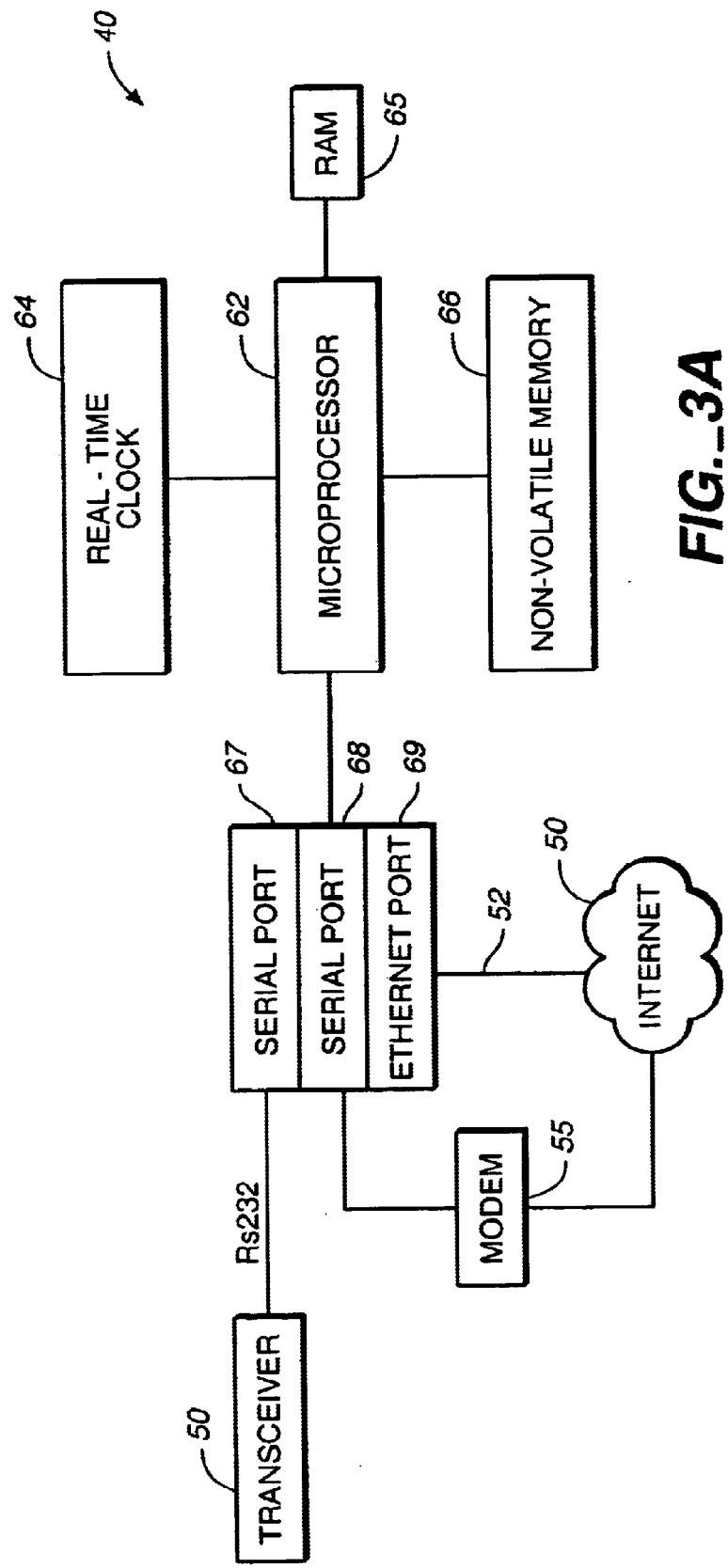

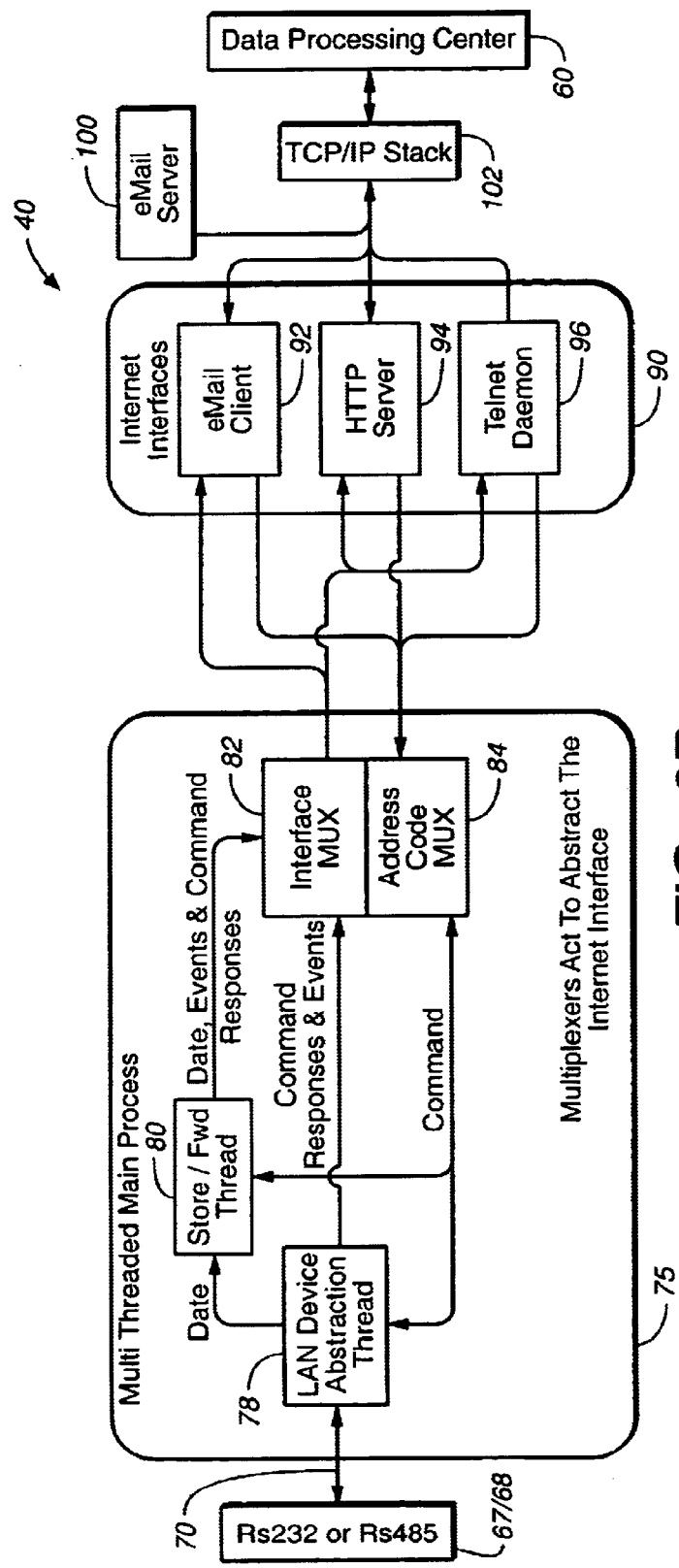
FIG._3B

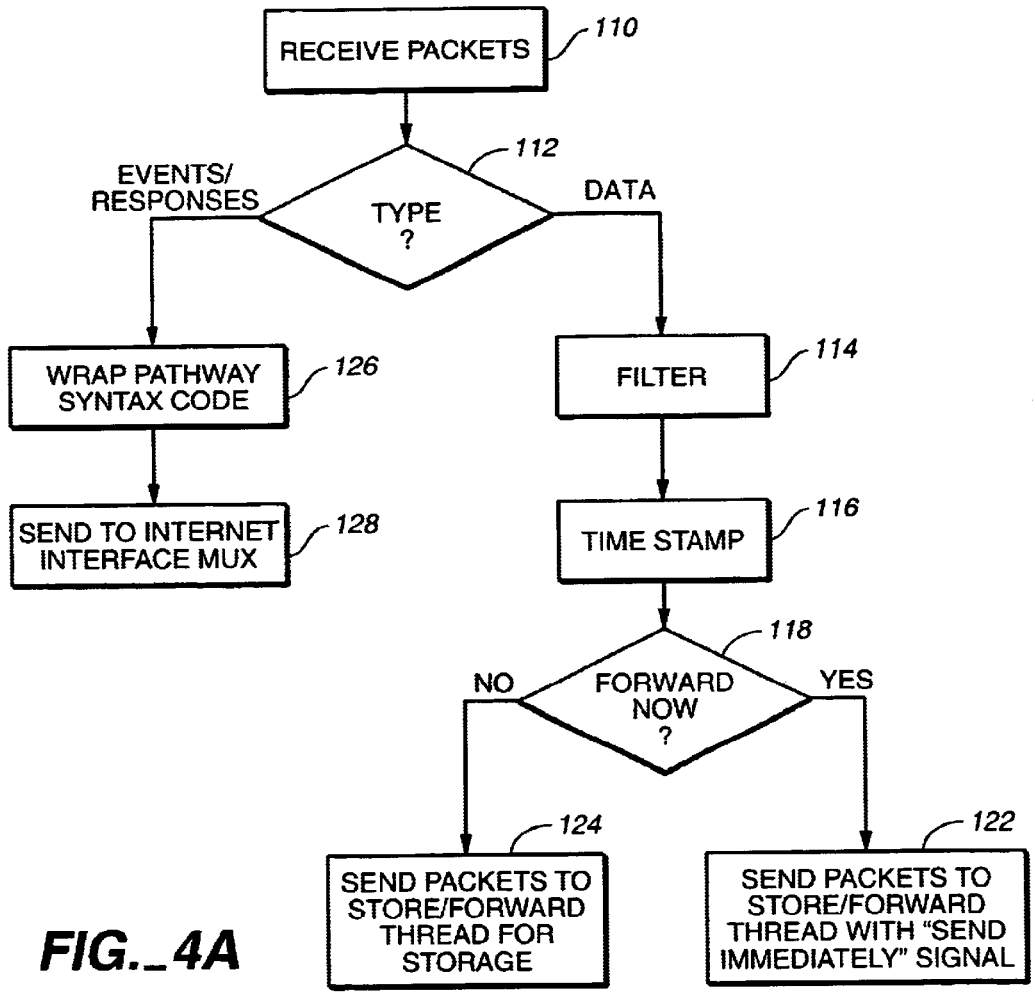
FIG._4A
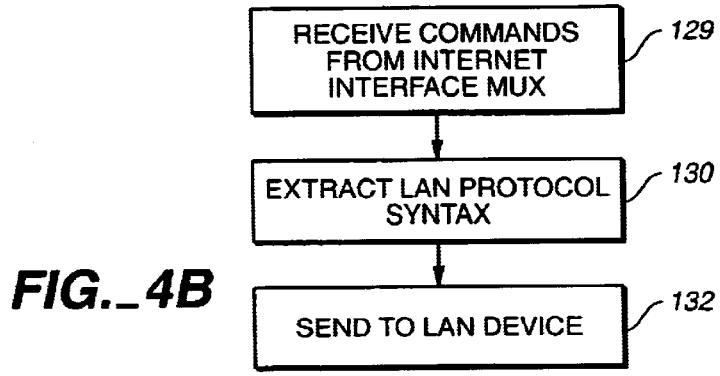
FIG._4B

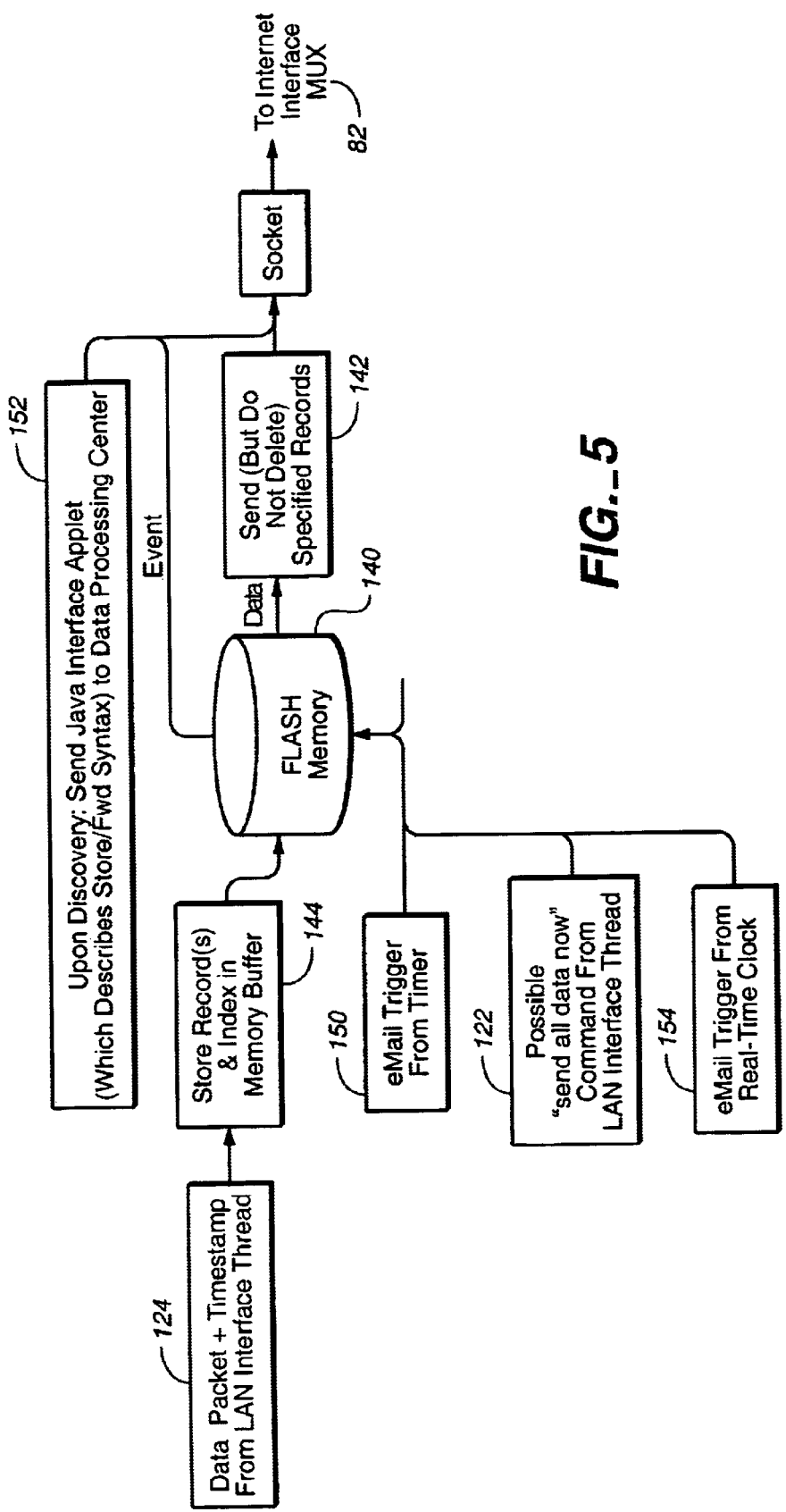
FIG._5

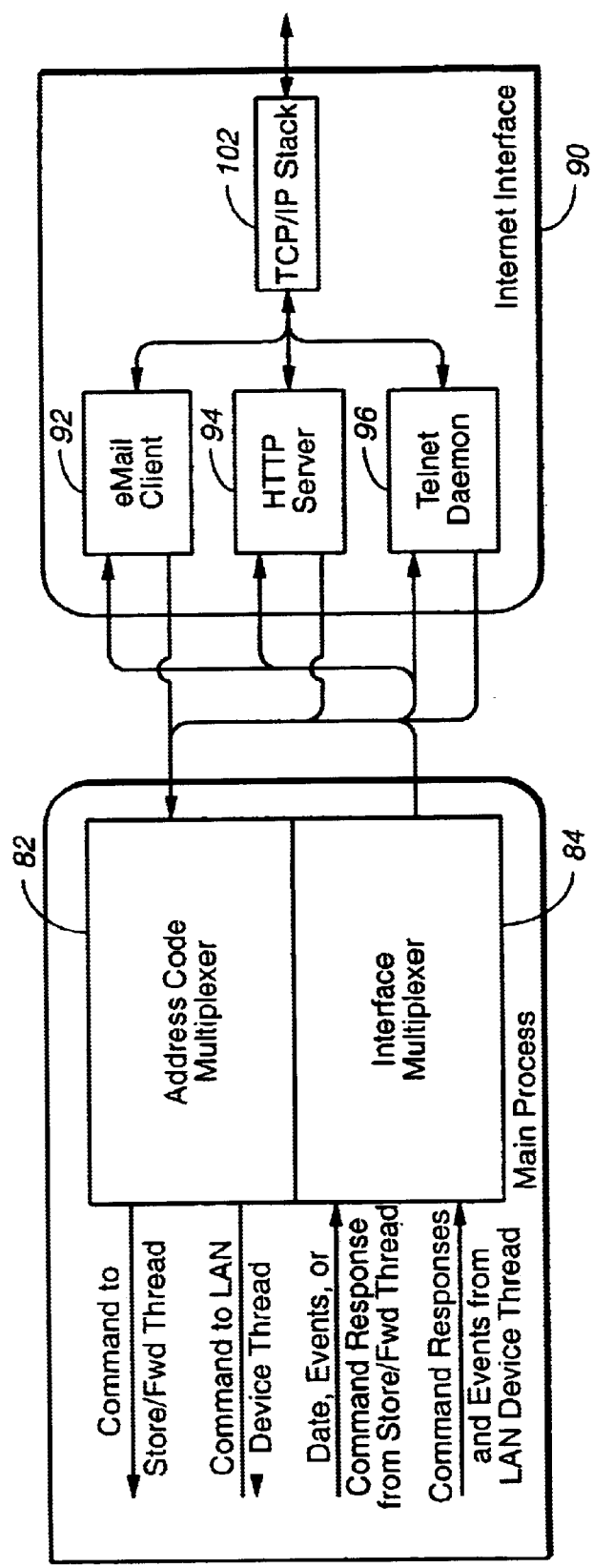
FIG._6

| Time Stamp | Index | LAN Address | Protocol ID | Msg Length | Flag | Length | Msg |
|---|---|---|---|---|---|---|---|
| 08/17/99 14:10:52 | 0x3F22 | 2811 | 0x04 | 0x1C | 0x0D | 0x18 | 0x09 5E |
| 08/17/99 14:10:06 | 0x3F21 | 2811 | 0x04 | 0x1C | 0x0D | 0x18 | 0x09 5E |
| | | | | | | | |
| | | | | | | | |
| | | | | | | | |
| | | | | | | | |

Packets which have not yet eMailed are white.

FIG._7

METER TO INTERNET PATHWAY

CROSS-REFERENCE TO RELATED APPLICATIONS

This application claims the benefit of the earlier filing date of U.S. patent application Ser. No. 09/470,258, filed on Dec. 22, 1999 and converted to a Provisional application by petition under 35 CFR 1.53(c)(1) on Mar. 17, 2000. The entire disclosure of the above-mentioned application is incorporated herein by reference. This application is also related to U.S. Pat. No. 6,195,018, filed on Feb. 7, 1996, the entire disclosure of which is incorporated herein by reference.

BACKGROUND OF THE INVENTION

The present invention relates to telemetry systems, and, in particular, to transmission of telemetry data through a network connection, such as an internet connection, to a data processing center.

Metering is the periodic measurement of a parameter at multiple locations. For example, utility companies meter the natural gas, electricity and water consumed by households. The cost of electricity can vary throughout the day, as utility companies often wish to charge different rates at different times of the day. For example, an electrical utility company may wish to charge higher rates during peak hours of consumption, e.g., the morning and evening. In addition, electrical utility companies may wish to apply a penalty if a consumer exceeds a certain limit within a particular period of time.

The collection of data from a metering system is often performed by physical inspection of individual meters. For example, in residential areas, electrical utility companies use electromechanical meters with rotating disks to measure the consumption of electricity. Electrical utility companies send a "meter reader" to record the meter measurement about once a month. Metering of natural gas and water is handled similarly.

The physical inspection of meters by the meter readers on a frequent basis is expensive. Therefore, an automated system to electronically transmit metering information could provide considerable cost savings for frequently read meters.

SUMMARY OF THE INVENTION

In general, in one aspect, the invention features a data collection system having a plurality of telemetry devices and collection devices. The telemetry devices have a sensor configured to generate a series of successive measurements by measuring a parameter at a series of measurement times, a memory configured to store a plurality of measurements from the series of successive measurements, and a transmitter configured to transmit measurements stored in memory to a collection device. The collection devices have a hub to receive transmissions from the sensor, and a network device to forward a subset of a series of transmissions over a network connection to a data processing center to generate an output function.

Implementation of the invention may include one or more of the following features. The network connection may be an internet connection. The network device may comprise an internet interface, and the internet interface may comprise an e-mail client, a Hypertext Transmission Protocol (HTTP) server, or a telnet daemon. The sensor may have a counter for storing a value, means for incrementing the counter upon receipt of a trigger signal, and means for storing the value from the counter in the memory and resetting the counter at different measurement times. The telemetry devices may include a first timer having a predetermined time interval wherein the expiration of the predetermined time interval may cause the sensor to generate a measurement. The hub may comprise a radio-frequency local area network (LAN) transceiver or a power line carrier LAN transceiver. The network device may be electronically connected to the hub. The data processing center may forward one or more commands through the network connection to the hub.

In another aspect, the invention is directed to a method of collecting data, including receiving a series of successive measurements from a series of transmissions from a telemetry device, storing and filtering the series of successive measurements, and transmitting the filtered data through an internet connection to a processing center.

Implementation of the invention may include time stamping the filtered data, storing the filtered data, and forwarding the filtered data to an internet interface. The step of transmitting the filtered data through the internet connection may include triggering an e-mail to forward a subset of the stored filtered data, and the step of triggering the e-mail may include sending data after a predetermined period of time or sending data after receiving a predetermined number of packets. The step of transmitting the filtered data through the internet connection may include dialing an internet service provider (ISP) to establish a point-to-point protocol (PPP) connection.

In another aspect, the invention is directed to a network device connected to a receiving device configured to collect data generated by a plurality of sensors. The network device has a microprocessor to process data, at least one storage device to store data, and a transmitter to transmit data through an internet connection to a data processing center.

Implementation of the invention may include one or more of the following features. The network device may be connected to the receiving device using a serial port. The transmitter may transmit data to the internet via an ethernet connection. The transmitter may transmit data to the internet via a wireless Internet Protocol (IP) or a dial-up PPP connection. The network device may have a multiplexer to route data between the microprocessor and the transmitter. The network device may be connected to the internet by a dial-up PPP connection through an ISP. The network device may host at least one web page to display configuration information or data generated by the plurality of sensors. The network device may be installed in a location behind a corporate firewall.

In another aspect, the invention is directed to a network device configured to collect data generated by a plurality of sensors. It includes a computer program having instructions for causing the device to interface with a LAN device, which receives data from the sensors. The program also includes instructions for causing the device to store and forward data, and interface with a network connection to transmit data to a remote center.

Implementation of the invention may also include one or more of the following features. The computer program may include instructions to detect the arrival of data from the plurality of sensors, process the data, and send commands to the LAN device to change an attribute value. The instructions to process the data may trigger an e-mail containing the processed data. The instructions to interface with the network connection may comprise instructions to send data through an HTTP server or through a telnet daemon in response to a request.

In yet another aspect, the invention is directed to a data collection system having a plurality of sensors each of which is configured to sample a parameter value at discrete measurement times. The sensors include a transmitter configured to transmit measured data. The system further includes a collector having a receiver configured to receive data transmitted by the plurality of sensors, a processor configured to filter and store data received by the receiver from the plurality of sensors, and a transmitter configured to transmit the processed data to a monitoring station by an internet connection.

In another aspect, the invention is directed to a data collection system having a plurality of measurement sensor means each located near a consumer of electricity for measuring data relating to consumer usage of electricity and for transmitting the measured electricity usage data. The system further includes a collector means having a receiver for receiving electricity usage data transmitted by the plurality of sensor means, a processor for computing electricity usage information from electricity usage data received by the receiver, and a transmitter for transmitting the electricity usage information to a monitoring station through an internet connection.

In yet another aspect, the invention is directed to a network for collecting data generated by a plurality of sensors. The network includes a plurality of data generating devices having a sensor to measure a parameter to generate measurements, a memory configured to store the measurements, and a transmitter to transmit the stored measurements to an intermediate device at a plurality of transmission times, there being fewer intermediate devices than data generating devices. The intermediate devices have a receiver to receive transmissions from a subset of the data generating devices, a processor to filter the measurements from the transmissions and analyze the measurements to generate a metered function of the parameter, and a transmission module to transmit the metered function over an internet connection. The network further includes a data station to receive transmitted metered functions from the plurality of intermediate devices.

In another aspect, the invention is directed to a method of collecting data comprising the steps of generating measurements by measuring a parameter using a telemetry device, storing a plurality of the measurements in a memory, transmitting the stored measurements to a collection device, processing the transmitted measurements at the collection device, and transmitting, under a plurality of triggering conditions, the processed measurements to a monitoring station by a network connection.

Implementation of the invention may include one or more of the following features. The method may include storing an old number in the collection device, generating a new number in the telemetry device for each generated measurement, and comparing the old number to determine which measurements are new measurements not previously received by the collection device and whether there are any missing measurements. The invention may also include storing the old number in the telemetry device wherein the step of generating the new number includes incrementing the old number.

In yet another aspect, the invention is directed to a method of collecting data including the steps of receiving a series of successive measurements from a series of transmissions from a telemetry device, storing and filtering the series of successive measurements by a pathway device connected to a LAN transceiver capable of receiving the series of transmissions, and transmitting the filtered data through an internet connection to a remote center for generation of a metered output function at the remote center.

In implementing the invention, the remote center may be a data processing center or a customer site.

The advantages of the invention include the following. The metering system provides metering without physical inspection of the individual meters and uses wired or wireless communication channels to transmit information. In addition, the metering system is cost-effective and reliable; it can be configured to be resistant to power failures; and it can be adaptable to a variety of applications and equipment provided by different vendors.

Furthermore, this invention capitalizes on the wide availability of the internet, or other equivalent wide area networks, for transferring information to a remote processing center without incurring additional significant network layout costs. Also, by shifting the processing of data to a remote center, the system can be implemented with a simple pathway device which serves only as a forward/storage thread, and which can be supplied by different vendors. However, the invention is also useful where the data is processed at an intermediate level, and the processed data is transmitted to a remote processing center over an Internet connection.

Additional objects and advantages of the invention will be set forth in the description which follows, and in part will be obvious from the description, or may be learned by practice of the invention. The objects and advantages of the invention may be realized by means of the instrumentalities and combinations particularly pointed out in the claims.

BRIEF DESCRIPTION OF THE DRAWINGS

The accompanying drawings, which are incorporated in and constitute a part of the specification, schematically illustrate the invention, and together with the general description given above and the detailed description given below, serve to explain the principles of the invention.

FIG. 1 is an overall diagram of a telemetry transmission system according to the present invention.

FIG. 2 is a schematic diagram of a meter of FIG. 1.

FIG. 3A is a schematic diagram of the hardware components of a pathway device of FIG. 1.

FIG. 3B is a schematic illustration of the software components inside the pathway device of FIG. 1.

FIG. 4A is a flow diagram of the processing steps of a Local Area Network (LAN) device abstraction thread of the pathway device.

FIG. 4B is a supplementary flow diagram of the processing steps of the LAN device abstraction thread of the pathway device.

FIG. 5 is a schematic illustration of the Store/Forward thread of the pathway device.

FIG. 6 is a schematic illustration of the information exchanged among the various threads of the pathway device.

FIG. 7 is a sample web page hosted by the pathway device.

DESCRIPTION OF THE INVENTION

A metering or data collection system according to the present invention may be used in a variety of applications, such as utility metering, manufacturing control, traffic monitoring, vending machine monitoring, copy machine monitoring, event monitoring, and meteorological data gathering. Data gathered by the collection system include electricity usage (kilowatt-hours), natural gas flow (cubic feet), water flow (cubic feet), temperature (° C.), pressure (Torr), humidity (partial pressure), wind speed (miles per hour), precipitation (inches), voltage (volts) and current (amperes), all of which can be quantified by a measuring device in terms of pulse counts, analog voltage level, or multi-byte digital values, etc.

As shown in FIG. 1, a metering system or network 100 has at least a plurality of meters ("M"), or end-point devices, 10, 11, 12, 13, 14, 15, 16, 17 situated at sites #1, #2, and #3. Although FIG. 1 shows only eight meters, system 100 potentially can monitor the readings of hundreds of thousands of meters. The meters are located as required for a particular application. For example, an electrical utility company could place one meter at each house in a residential neighborhood to measure electrical energy consumption. Each meter may be constructed similarly as described below.

A set of collection devices 20–22 receive transmissions from meters 10–17. Each collection device includes a transceiver and a pathway device. The transceivers included in the collection device can be a variety of Local Area Network (LAN) transceivers, including, but not limited to, radio frequency local area network transceivers (RF LAN Transceiver) 30 and 32 manufactured by CellNet of San Carlos, Calif., or a power line carrier LAN transceiver 31. The transceivers can also include infrared LAN transceivers.

Each collection device 20–22 receives transmissions from one or more meters. In general, the likelihood of a successful transmission from a meter to a collection device is correlated with the distance between that collection device and that meter. In one implementation of network 1, the transmissions from a meter in the set of meters 10–17 may be received by the transceivers of more than one collection device. Since the redundant reception of the same transmission from a meter is inefficient, the collection devices are coordinated to eliminate such redundancy. The coordination works as follows: the first time a collection device receives a transmission from a particular meter, that collection device begins to process the transmission to measure the effective signal strength and estimate the radio link reliability for that meter. Each collection device that discovers this particular meter will process the transmission in a similar fashion. Upon comparing the processed results, the collection device that has indicated the strongest signal will be designated the "tracking collection" for this particular meter. Any other collection devices that have discovered the same meter are commanded to "untrack" that meter. Each collection device will have a database storing the addresses of the meters that are tracked and untracked. A collection device will only process data from a "tracked" meter.

Connected to LAN transceivers 30–32 are pathway devices 40–42. The connections are, in one implementation, serial connections, such as Recommended-Standard 232 (RS232) or Recommended-Standard 485(RS-485). In another implementation, the connections can be other equivalent types of interfaces.

Pathway devices 40–42 also have various internet interfaces for connecting to the Internet, or any other equivalent network. Pathway device 40 is connected to Internet 50 by an Ethernet connection 52. Ethernet connection 52 is a part of a corporate LAN and is located behind a firewall 45, which runs proxy services for the corporate LAN and provides a connection 55 to Internet 50. Pathway device 41 is connected to Internet 50 through a wireless connection 54. Pathway device 42 is connected to Internet 50 by a dial-up point-to-point protocol (PPP) connection 56 over a telephone line on a public-switched telephone network (PSTN). The network connections 54, 55, or 56 can be either static internet connections using a always-on corporate LAN, Digital Subscriber Line (DSL) modem, cable modem or others, or they can be Dynamic Host Configuration Protocol (DHCP) connections which are not continuously connected to Internet 50. Pathway devices 4042 filter transmissions from meters 10–17 and forward the transmissions to data processing center 60 over Internet 50 or other equivalent networks.

Data processing center 60 may alternatively be termed a monitoring station or central station. Data processing center 60 also sends command messages to collection devices 20–22 to, for example, change attributes of LAN transceivers 30–32. In cases where the data processing center 60 has not been a priori programmed with an understanding of the LAN transceiver protocol, the pathway devices 40–42 will send Java byte code to the data processing center 60 when they communicate with the data processing center 60 for the first time. This byte code translates between the LAN transceiver data packet syntax and the syntax required by the data processing center. This center 60 can alternatively be termed a monitoring center.

The data processing center 60 analyzes the periodic measurements by one or more meters 10–17 to generate a metered function. For example, an electrical utility company could request from the data center 60 the electricity consumed each hour over the last twenty-four hours, the total amount of electricity consumed between 6 p.m. and 8 p.m. over the last month, or the time of peak electricity consumption in the previous day, at each house in a residential neighborhood.

In another embodiment, the pathway devices 40–42 can analyze the periodic measurements by one or more meters 10–17 to generate a metered function. The generation of metered functions at the collection device level is described in above-identified U.S. patent application Ser. No. 08/597,724.

Meters 10–17 periodically send their measurements to collection devices 20–22. In one implementation, meters 10–17 accumulate and transmit the consumption of metered entity on a pseudorandom basis over 300 times per day. The packets transmitted in each transmission includes redundant data transmitted in each of several previous transmissions. This temporal redundancy is desirable to improve system reliability. Redundant data will be filtered by collections devices 20–22 as explained below.

As mentioned earlier, each meter will have one tracking collection device in one implementation. These transmissions may be any sort of wireless signals such as radio frequency transmissions 160 or 162 (or other wireless signals such as microwave or infrared), or wired signals such as from a power line carrier 161, phone line wiring, or custom wiring. Each collection device receives transmissions from one or more meters. For example, collection device 20 receives transmissions from meters 10-12. A collection device may receive transmissions from one to several thousand meters, limited only by the volume of data traffic that LAN can sustain. Although FIG. 1 shows only three collection devices, system 100 may include hundreds or thousands of collection devices, depending upon the number of meters in system 100.

At the data processing center 60, the periodic measurements are analyzed to generate a metered function of the measured parameters. The metered function information could be the minimum, maximum or average value of the parameter over a certain time period. The intelligence in the data processing center 60 permits the use of inexpensive meters 10–17 which may only have processing power to perform measurements and transmit the measurements to inexpensive collection devices 20–22. As mentioned above, the intelligence in the data processing 60 can also be shifted to collection devices 20–22 to have the generation of metered functions be conducted by pathway devices 40–42 in another implementation.

Referring to FIG. 2, each meter, e.g., meter 10, includes a microprocessor 35, a parameter sensor 34, a power supply 33, a clock 36, a memory 38, and a transmitter 46. In another implementation, meter 10 may also have a receiver. Memory 38 includes several registers 43 and a pulse counter 44. Registers 43 and counter 44 store measurements from sensor 34. In one embodiment of meter 10, memory 38 has eighteen registers. Memory 38 is constructed of non-volatile memory devices, such as erasable programmable read-only-memory chips (EPROMS), so that stored measurements are not lost if the power to power supply 33 fails.

Meter 10 measures the parameter at a series of measurement times. In normal operations, a set time interval $T_{int}$, such as 2.5 minutes, separates each measurement time. Meter 10 can be configured either as a pulse accumulator meter or as a sampling meter. In the pulse accumulator mode, sensor 34 is triggered by a change in the parameter. Each time that sensor 34 is triggered, the sensor sends a pulse to processor 35. In response to the pulse, processor 35 increments counter 44. At the expiration of time interval $T_{int}$, as measured by clock 36, the content of counter 44 is stored in a register and the counter is cleared. In the sampling mode, sensor 34 does not automatically send signals to processor 35 when the parameter changes. Instead, sensor 34 continuously monitors the parameter, and processor 35 periodically, e.g., at the expiration of time interval $T_{int}$, samples the sensor to receive a measurement. Processor 35 stores the measurement in counter 44.

Whether configured as a pulse accumulator meter or a sampling meter, the measurements by sensor 34 are stored in memory 38. At the expiration of time interval $T_{int}$, processor 35 discards the oldest measurement stored by register set 43 and places the newest measurement from counter 44 into the empty register.

Meter 10 transmits its stored measurements to collection device 20 at a series of transmission times. Memory 38 stores a transmission frequency $N_{sup}$ which represents the number of measurement times per transmission. Processor 35 triggers a transmission time after $N_{Sup}$ measurements. At the transmission time, processor 35 causes transmitter 46 to transmit the contents of registers 43 to collection device 20.

In one embodiment, a pulse-accumulator meter is retrofit to an existing electromechanical meter used by most electrical utility companies. Electromechanical meters use the flow of electricity to rotate a metal disk. The disk turns dials on the meter register to show the total consumption of electricity.

Sensor 34 and other components of meter 10 are described in more detail in above-identified U.S. patent application Ser. No. 08/597,724.

The configuration of meter 10 as a pulse accumulator meter or as a sampling meter will depend on the intended application of system 500. Similarly, many sorts of sensors could be used with the present invention, depending on the application of system 500. For example, in a traffic monitoring system, a pulse accumulator meter could be used to count the number of automobiles that travel over a particular road. Such a pulse accumulator meter could use a pneumatic line as a sensor. As another example, in a weather monitoring system, a sampling meter could be used to periodically sample the atmospheric temperature. Such a sampling meter could use a thermocouple as the sensor.

After each transmission, collector 20 will examine the "new" measurements, i.e., the measurements in the most recent transmission which were not included in the previous transmission. Collector 20 may ignore the "old" measurements. Because a sequence number counter is incremented with each measurement, the number of new measurements in a transmission is indicated by the sequence number. If no transmissions are missed, the difference between the old and new sequence numbers will equal the transmission frequency $N_{sup}$. For example, if $N_{sup}$ equals two, and no transmissions are missed, then only the two most recent measurements will be new. However, if several transmissions are missed, then the difference between the sequence numbers may be greater than two. Additionally, an alignment timer is driven by clock 36 to count down a delay time between a measurement time and a transmission time. Another variable stored in memory 38 is an alignment time variable, $T_{align}$, which represents a delay between the measurement time and the actual transmission time.

Referring to FIG. 3A, pathway device 40, for example, includes a microprocessor 62, such as MC68EN302 manufactured by Motorola. Pathway device 40 also includes a non-volatile memory (such as FLASH memory) 66, a random access memory (RAM) 65, a real-time clock 64, two serial ports 67 and 68, and one Ethernet port 69. The pathway device may use either Ethernet port 69 to connect to Internet 50, or a phone line and modem 55 to connect to the Internet through serial port 68. The number of serial and Ethernet ports shown here are for illustrative purposes only and can vary in different implementations. The pathway device 40 in general provides a way to send telemetry data from a serially connected transceiver 30 available from a variety of vendors, such as from CellNet of San Carlos, Calif., through an internet connection to a data processing/monitoring center.

Referring to FIG. 3B, the major software components in the pathway device 40 are shown. Pathway device 40 is connected to LAN transceiver 30 of collection device 20 by a serial connection 70 in one implementation. However, pathway device 40 and LAN transceiver 30 can be connected by a variety of other connections suitable for connecting devices which are situated in close physical vicinity, such as parallel connection or memory map configuration. Referring back to FIG. 3A, in one aspect, LAN transceiver 30 functions as a hub to which meters 10–12 are connected. Upon receiving transmissions from meters 10–12, LAN transceiver 30, or hub, uses serial port 67 or 68, such as serial connection Recommended Standard-232 (RS232) or Recommended Standard-485 (RS485), to send data to, or receive commands from, the pathway device 40. In one implementation, the pathway device 40 sends synchronous packets to LAN transceiver 30 to initiate communication, and LAN transceiver 30 responds synchronously to each message. The synchronous packets are, in one implementation, for the purpose of configuring status requests, and they are always responded to. LAN transceiver 30 also initiates asynchronous packets to pathway device 40 when the LAN radio successfully receives and interprets an RF packet and sends the data to the pathway device 40. The asynchronous packets are not sent at regular intervals, and they are not responded to.

Inside the pathway device's multi-threaded main process 75, there are three major threads: LAN device abstraction thread, or LAN interface thread 78, store/forward thread 80, and an interface thread including interface multiplexer 82 and address code multiplexer 84. Communication among threads within a process can be by either shared memory or sockets. Internet interfaces 90 including e-mail client 92, Hypertext Transmission Protocol (HTTP) server 94, and telnet daemon 96 form a different process. Internet interfaces 90 can be provided by third-parties as separate processes. E-mail client 92 either uses another remote e-mail server provided by an Internet Service Provider (ISP) or an e-mail server connected to a corporate LAN, or e-mail client 92 uses an internal e-mail server 100 included in pathway device 40. Via the different channels, Internet interfaces 90 transmit data through the Transmission Control Protocol/Internet Protocol (TCP/IP) stack 102 to data processing center 60. Command messages are also forwarded to the pathway devices using the same channels.

If an authorized field representative or any other authorized party wishes to access data available at the pathway device 40, they may log on to pathway device 40 through the telnet daemon 96, or by accessing one or more web pages supported by HTTP server 94. FIG. 7 is a sample web page supported by the HTTP server 94. Their logon-username is associated with the packet's destination code applied by accept/reject filter 114, to restrict their access only to that of data with the matching destination code. For example, the authorized representative can tell from this web page whether a packet has been forwarded to the data processing center 60. For example, notice 150 states that packets which have not been e-mailed in a while are the white rows, as opposed to the shaded rows which represent packets which have already been mailed. The column headings for each row includes the time the packet is stamped (152), the index value of the packet (154), the LAN address of the meter which transmitted this packet (156), the protocol ID (158), the length of the message (160), the flag value (162), the packet length (164) and the payload for the message (166). While the majority of the data is forwarded to data processing center 60 through e-mail client 92, data processing center 60 or the authorized field representative may wish to check for missing data, or check for data before transmission time, by accessing telnet daemon 96 and/or HTTP server 94.

Referring to FIGS. 4A and 4B, the LAN interface thread 70 has three major functions: (1) to process received data from meters 10–12, (2) to send commands to LAN transceiver 30, and (3) to send JAVA byte code to the data processing center 60 to inform the center 60 how to format messages to LAN transceiver 30. When packets arrive from meters 10–12 through communications link 70 (step 110), thread 78 responds promptly to avoid handshake timeout periods. Usually the incoming packets will have cyclical redundancy check (CRC) values which must be checked for data validity. Next, the type of packet just received will be determined (step 112). If the incoming message contains data (as opposed to an event message or a command response), then the data will be forwarded to the accept/reject filter (step 114). The pathway devices have a programmable filter designed to accept or reject data according to a pre-defined field-dependent criteria, such as the LAN address of the meter which transmitted the data. Some data coming from some sensors will also be rejected by the filter because of the overlapping LAN transceivers and pathway devices attending to the same sensors. The redundant data submitted by the same meter, on the other hand, will not be rejected. Accepted data will be time-stamped (step 116) to record the date and time of day that it arrived. The table with pre-defined field-dependent criteria also contains optional destination codes defining the recipient to which the data will ultimately be sent. The possible destinations include a data processing center or various customers. Rejected data are discarded. The data and accompanying timestamp are stored at the pathway device 40 before being forwarded to the data processing center 60. At decision point 118, thread 70 decides whether or not to forward the data immediately. If the data is not to be forwarded immediately, the data goes to store/forward thread 80 for storage (step 124). Otherwise, the store/forward thread is signaled to send all data now (step 122). The test used at decision point 118 is based on packet values such as those in the ID field.

If the incoming message is an event or a response to a previous command message, pathway device syntax codes are wrapped around the message (step 126) and the entire packet is forwarded to internet interface multiplexer 82 (step 128) through a socket.

If commands are received from the data processing center 60, thread 78 follows the steps outlined in FIG. 4B. Thread 78 receives commands from internet interface multiplexer 82 (step 129), extracts LAN protocol syntax from pathway command messages (step 130), and forwards them for output to the LAN transceiver (step 132). In one implementation, when the data processing center 60 wishes to change an attribute value on the LAN transceiver 30, it sends Java bye codes to assemble a command message containing all the required field values. This command message is then wrapped with the pathway device header, and directed to the interface thread 78. These commands can also send messages over the LAN to telemetry devices which are capable of receiving messages. Additionally, when a pathway device 40 is first installed, the device 40 is announced to the data processing 60 ("discovery"). Thread 78 sends JAVA interface byte code describing LAN syntax to data processing center 60. In this manner, LAN transceivers by various vendors with different LAN syntax can be incorporated into system 500.

FIG. 5 explains in detail the functionalities of the store/forward thread 80. Thread 80 stores received and filtered data packets from step 124 of FIG. 4A and forwards them to the recipient defined by the destination code which was optionally appended by the accept/reject filter 114. Packets without a destination code will be sent to the data processing center 60. There is a configurable table associating destination codes with valid eMail addresses and logon usernames. The packets can be forwarded as soon as they arrive, but storage is required in those where the pathway device is not continuously connected to the Internet. The main storage device of thread 80 is non-volatile memory 140. Each incoming data packet is stored (step 144) with an index value and two flags, indicating "data sent" or "data acknowledged." After a data is sent (step 142) it is flagged as having been sent. The index is used by the data center 60 to check for missing packets. Packets are not automatically deleted after being sent to data center 60. They are only dropped after non-volatile memory 140 is full and they are the oldest time-stamped packets in storage.

Thread 80 also contains e-mail trigger 150. A timer for triggering e-mail can be part of the microprocessor 62. Alternatively, e-mail triggers can be coming from real-time clock 64. SEND IMMEDIATELY signals coming from step 122 of FIG. 4A will also trigger FLASH memory 140 to send specified records (step 142). There are a variety of triggering conditions to cause a pathway device to send out e-mail messages to the destination, such as data processing center 60. Messages can be sent after a certain number of minutes, after receiving a certain number of packets, or periodically at fixed times. Both previously unsent packets as well as unacknowledged packets are sent at each trigger. Sometimes intermediate mail servers in the Internet are improperly configured and can lose e-mail messages. Since the thread 80 re-sends unacknowledged packets, the data processing center improves its chances of recovering lost or delayed e-mail messages. If the delayed e-mail message eventually reaches the data processing center, the index values are used to reject duplicate data.

Thread 80 also sends Java interface byte code describing store/forward thread syntax to data processing center 60 (step 152) upon discovery, as explained above.

FIG. 6 shows the message routing between the Internet interfaces 90, threads 70, 80, and multiplexers 82 and 84. Address code multiplexer 82 tags the incoming internet packets and remembers which interface they came from, and directs commands from the data processing center 60 to either thread 70 or thread 80. Commands to thread 80 would be used to adjust its parameters (such as e-mail trigger thresholds), or to check its status. Commands to thread 70 would be used to configure the LAN transceiver or to send messages to telemetry devices with reception capability. Interface multiplexer 84 determines which of the network interface protocols (e-mail, web pages, tenet terminal emulation) to use for messages to data processing center 60 and/or other destinations, and formats the stored packets according to the chosen interface specification. Interface multiplexer 84 also receives data, events, or command response from store/forward thread 80, or command responses and events from LAN device thread 78.

In summary, the metering system of the present invention monitors multiple meters. Each meter periodically measures a parameter, such as electricity consumption, and stores the sequence of measurements. Each meter periodically transmits the contents of its registers to a collector by wireless or wired signal. When a collector receives a transmission, it time stamps and stores those messages which pass through its filter. When any of a number of triggers occurs, the stored messages are forwarded through a network connection to a data processing center or other authorized destinations. The data processing center determines which meter (indicated by LAN address) sent the transmission, extracts the previously unprocessed measurements, and then generates a metered function, such as a load profile, a time-of-use profile, or a demand profile. The data processing center can compensate for missed transmissions and power failures. The steps of generating the metered function at the collection level is explained in U.S. patent application Ser. No. 08/597,724. The operator of the metering system determines how the metered functions are used by the processing center/monitoring station, e.g., an electrical utility company may have the monitoring station generate a customer billing using the metered function.

The present invention has been described in terms of a preferred embodiment. The invention, however, is not limited to the embodiment depicted and described. Rather, the scope of the invention is defined by the appended claims.

What is claimed is:

1. A data collection system comprising:
a) a plurality of telemetry devices, each telemetry device including:
   i) a sensor configured to generate a series of successive measurements by measuring a parameter at a series of measurement times,
   ii) a memory configured to store a plurality of measurements from said series of successive measurements, and
   iii) a transmitter configured to transmit measurements stored in memory to a collection device at a series of transmission times; and
b) a plurality of collections devices, there being fewer collection devices than telemetry devices, each collection device including:
   i) a hub to receive transmission as packets from selected of the plurality of telemetry devices, the transmissions containing both old measurements and new measurements;
   ii) a network device to forward at least a subset of a series of said transmissions over an internet connection to a data processing center to generate an output function;
   iii) at least one storage device for storing selected of the received transmissions; and
   iv) a Hypertext Transmission Protocol (HTTP) server configured to host at least one web page that displays information corresponding to selected of the received and forwarded transmissions.

2. The data collection system of claim 1, further comprising an e-mail server.

3. The data collection system of claim 1, wherein said sensor comprises:
a counter to store a value;
means for incrementing said counter upon receipt of a trigger signal; and
means for storing said value from said counter in said memory and resetting said counter at said measurement times.

4. The data collection system of claim 1, wherein said telemetry device further comprises a first timer having a predetermined time interval, wherein the expiration of said predetermined time interval causes said sensor to generate a measurement.

5. The data collection system of claim 1, wherein said hub comprises a radio-frequency local area network (LAN) transceiver.

6. The data collection system of claim 1, wherein said hub a radio-frequency local area network (LAN) receiver.

7. The data collection system of claim 1, wherein said hub comprises a power line carrier LAN transceiver.

8. The data collection system of claim 1, wherein said network device is electronically connected to a hub.

9. The data collection system of claim 1, wherein the network device is serially connected to the hub using Recommended Standard-232 (RS232).

10. The data collection system of claim 1, wherein said parameter is selected from the group consisting of electrical power, fluid flow, voltage, current, temperature, pressure and humidity.

11. The data collection system of claim 1, wherein the series of measurements are selected from the group consisting of pulse count, an analog voltage, a current level, and a multi-byte digital value.

12. The data collection system of claim 1, wherein said network device further comprises an internet interface.

13. The data collection system of claim 12, wherein said Internet interface further comprises an e-mail client a Hypertext Transmission Protocol (HTTP) server, and a telnet daemon.

14. The data collection system of claim 1, wherein the data processing center forwards one or more commands through the internet connection to the hub.

15. The data collection system of claim 14, wherein the one or more commands contain configuration information.

16. The data collection system of claim 14, wherein the hub passes the one or more commands to a subset of the plurality of telemetry devices.

17. A network device connected to a receiving device configured to collect data generated by a plurality of sensors, comprising:
- a micro-processor to process data generated by the plurality of sensors and collected by the receiving device, including time-stamping and filtering;
- at least one storage device to store at least a subset of processed data;
- a transmitter to transmit data through an internet connection to a data processing center; and
- an HTTP server to host at least one web page that displays the collected data.

18. The network device of claim 17, wherein the receiving device comprises a transceiver.

19. The network device of claim 17, wherein the receiving device comprises a receiver.

20. The network device of claim 17, wherein the network device is connected to the receiving device using a serial port.

21. The network device of claim 17 wherein the transmitter transmits data to the internet via an Ethernet connection.

22. The network device of claim 17, wherein the transmitter transmits data to the internet via a wireless Internet Protocol (IP).

23. The network device of claim 17, wherein the transmitter transmits data to the internet via a dial-up PPP connection.

24. The network device of claim 17, further comprising a multiplexer to route data between the micro-processor and the transmitter.

25. The network device of claim 17, wherein the network device is permanently connected to the internet.

26. The network device of claim 17, wherein the network device is connected to the internet by a dial-up PPP connection through a ISP.

27. The network device of claim 17, wherein the device hosts at least one web page to display data generated by the plurality of sensors.

28. The network device of claim 17, wherein the device is installed in a location behind a corporate firewall.

29. A network device configured to collect data generated by a plurality of sensors, comprising a computer program, residing on the device, the computer program comprising instructions for causing the device to:
- interface with a LAN device, the LAN device receiving data from the plurality of sensors;
- display data on at least one web page;
- store and forward data received by the LAN device; and
- interface an internet connection to transmit data to a remote center.

30. The network device of claim 29, wherein the instruction to interface with the LAN device further comprises instructions to:
- detect arrival of data from the plurality of sensors;
- process that data; and
- send commands from the remote center to the LAN device.

31. The network device of claim 29, wherein the instructions to process the data further comprise instructions to trigger an e-mail containing the processed data.

32. The network device of claim 29, wherein the instructions to interface the network connection comprise instructions to send data through an e-mail client.

33. The network device of claim 29, wherein the instructions to interface the network connection comprise instructions to send data a HTTP server in response to a request.

34. The network device of claim 29, wherein the instructions to interface the network connection comprise instructions to send data through a telnet daemon in response to a request.

35. A data collection system, comprising:
- a plurality of sensors residing in a plurality of meters, each of the plurality of sensors being configured to sample a parameter value at discrete measurement times and including a transmitter configured to transmit measured data;
- a plurality of collectors, each collector having a receiver configured to receive data transmitted by the plurality of sensors, a processor configured to filter and store data received by the receiver from the plurality of sensors, and a transmitter configured to transmit the filtered data as packets to a monitoring station for processing by an internet connection; and
- an HTTP server connected to host at least one web page displaying the received data.

36. The data collection system of claim 35, wherein the monitoring station processes the filtered data to compute electricity usage information.

37. A data collection system, comprising:
- a plurality of sensor means residing in a plurality of meters, each of the plurality of sensor means located near a consumer of electricity for measuring data relating to consumer usage of electricity and for transmitting the measured electricity usage data; and
- a collector means having a receiver for receiving electricity usage data transmitted by the plurality of sensor means, a processor for computing electricity usage information from electricity usage data received by the receiver, a transmitter for transmitting the electricity usage information to a remote center through an internet connection, and
- an HTTP server for hosting at least one web page displaying the received data.

38. The data collection system of claim 37, wherein the plurality of measurement sensor means measures data relating to consumer usage of gas and for transmitting the measured gas data.

39. A network for collecting data generated by a plurality of sensors, comprising:
- a) a plurality of data generating devices including:
  - i) a sensor to measure a parameter to generate measurements,
  - ii) a memory configured to store said measurements, and
  - iii) a transmitter to transmit said stored measurements to an intermediate device at a plurality of transmission times;
- b) a plurality of intermediate devices, there being fewer intermediate devices than data generating devices, said intermediate devices including:
  - i) a receiver to receive transmission from a subset of said plurality of data generating devices,
  - ii) a processor to filter said measurements from said transmissions and analyze said measurements to generate a metered function of the parameter,
  - iii) a transmission module to transmit the metered function over an internet connection; and iv) an HTTP server to host at least one web page displaying said measurements; and c) a data station remote from the plurality of intermediate devices to receive transmitted meter functions from said plurality of intermediate devices.

40. A method of collecting data comprising the steps of:
a) generating measurements by measuring a parameter using a telemetry device;
b) storing a plurality of said measurements in a memory;
c) transmitting said stored measurements and an alignment time from said telemetry device to a collection device;
d) displaying said measurements on at least one web page hosted by the collection device;
e) processing said transmitted measurements at the collection device, including a step of determining from said alignment time the measurement time of the most recent measurement in the transmission; and
f) transmitting, under a plurality of trigger conditions, said processed measurements as packets to a monitoring station by an internet connection.

41. The method of claim 40, wherein the processing step further comprises filtering said transmitted measurements and storing the filtered measurements.

42. The method of claim 40, further comprising the step of computing a metered function representing consumption information at the monitoring station.

43. The method of claim 40, wherein said parameter is selected from the group consisting of electrical power, fluid flow, voltage, current, temperature, pressure, and humidity.

44. The method of claim 40, further comprising the step of waiting an alignment time following a measurement to transmit said stored measurements.

45. The method of claim 44, further comprising the step of:
transmitting said alignment time from said telemetry device to said collector in a transmission;
determining a receipt time representing the time said collector receives said transmission; and
subtracting said alignment time from said receipt time to generate a time representing the measurement time of the most recent measurement in the transmission.

46. The method of claim 40, further comprising the steps of:
storing an old number in said collection device;
generating a new number in said telemetry device for each generated measurement; and
comparing said old number to said new number to determine which measurements are new measurements not previously received by said collection device and whether there are missing measurements.

47. The method of claim 46, further comprising the step of storing said old number in said telemetry device, wherein the step of generating said new number includes incrementing said old number.

48. The method of claim 47, further comprising the step of determining the measurement times for new measurements received by said collection device.

49. A method of collecting data comprising the steps of:
receiving a series of successive measurements from a series of transmissions from a plurality of telemetry devices;
storing and filtering the series of successive measurements by a pathway device connected to a LAN transceiver capable of receiving the series of transmissions; and
transmitting the filtered data as packets through an internet connection to a remote center for generation of a metered output function at the remote center; and
displaying the transmitted data on at least one web page hosted by the pathway device.

50. The method of claim 49, wherein the remote center comprises a data processing center.

51. The method of claim 49, wherein the remote center comprises a customer site.

* * * * *